US012576666B2

(12) United States Patent
Bonenfant et al.

(10) Patent No.: US 12,576,666 B2
(45) Date of Patent: Mar. 17, 2026

(54) SWAGING TOOL FORMING A STAMP, AND ASSOCIATED STAMPING PROCESS

(71) Applicant: MECO SA, Grenchen (CH)

(72) Inventors: Julien Bonenfant, Bienne (CH); Lucien Willemin, Bassecourt (CH); Rémy Thiry, Les Bréseux (FR)

(73) Assignee: MECO SA, Grenchen (CH)

( * ) Notice: Subject to any disclaimer, the term of this patent is extended or adjusted under 35 U.S.C. 154(b) by 42 days.

(21) Appl. No.: 18/418,715

(22) Filed: Jan. 22, 2024

(65) Prior Publication Data

US 2024/0270010 A1 Aug. 15, 2024

(30) Foreign Application Priority Data

Feb. 9, 2023 (EP) .................................... 23155862

(51) Int. Cl.
*B44B 5/00* (2006.01)
*B44B 5/02* (2006.01)

(52) U.S. Cl.
CPC ............ *B44B 5/0052* (2013.01); *B44B 5/022* (2013.01); *B44B 5/026* (2013.01)

(58) Field of Classification Search
CPC ........ B44B 5/0052; B44B 5/022; B44B 5/026
See application file for complete search history.

(56) References Cited

U.S. PATENT DOCUMENTS

| | | | | |
|---|---|---|---|---|
| 2,754,785 A | | 7/1956 | Zatko | |
| 5,909,907 A | * | 6/1999 | Oetiker | B21D 53/16 29/243.517 |
| 2022/0065353 A1 | * | 3/2022 | Johnson | F04B 53/1022 |
| 2022/0299301 A1 | * | 9/2022 | Lindsay | F42B 33/02 |

FOREIGN PATENT DOCUMENTS

| | | |
|---|---|---|
| CN | 110654152 A | 1/2020 |
| CN | 110802974 A | 2/2020 |
| EP | 0 808 677 A1 | 11/1997 |

OTHER PUBLICATIONS

European Search Report for 23 15 5862, dated Jul. 5, 2023.

* cited by examiner

*Primary Examiner* — David H Banh
(74) *Attorney, Agent, or Firm* — Sughrue Mion, PLLC

(57) ABSTRACT

A swaging tool (1) forming a stamp, including a lower unit (2) and an upper unit, the lower unit (2) forming a bed to receive the metal movement-blank (12), the upper unit (4) being equipped with an upper die, to swage the metal movement-blank (12) in place in the bed of the lower unit (2), and mounted movable along a movement axis. The lower unit (2) includes a pliers (14) equipped with two arms (16A2, 16B2) mounted movable, in a perpendicular plane to said movement axis, between an opening position and a closing position wherein the two arms are moved closer together and then defining a part of said bed for receiving the metal movement-blank (12) and, between them, an opening (18), the dimensions of which are less than the corresponding dimensions of an upper part (12A) and a lower part of the metal movement-blank (12).

18 Claims, 11 Drawing Sheets

SWAGING TOOL FORMING A STAMP, AND ASSOCIATED STAMPING PROCESS

CROSS REFERENCE TO RELATED APPLICATIONS

This application claims priority to European Patent Application No. 23155862.8 filed Feb. 9, 2023, the entire contents of which are incorporated herein by reference.

TECHNICAL FIELD OF THE INVENTION

The invention relates to the field of swaging tools, also known as stamps, intended to swage a metal movement-blank to plastically distort this movement-blank.

The invention thus relates to such a swaging tool forming a stamp, as well as an associated stamping process. The invention is intended in particular, but not restrictively, to produce a relief pattern, in particular a logo, on a top front surface of a horological crown head, particularly a watch winding crown head.

TECHNOLOGICAL BACKGROUND

Industrial stamping consists of plastically distorting a metal object (without returning to the original shape) thanks to a "die" fitted on a hydraulic, mechanical, screw press or a forging hammer; the whole forming a swaging tool (also known as stamp). This forging process performed hot or at ambient temperature can be performed in several operations, the first of which are called "movement-blanks", and the last "finish". The movement-blanks make it possible to distribute the metal, most often starting from a cylindrical or parallelepipedal shape, up to a shape approaching the finish. The last movement-blank has a greater vertical dimension and lesser horizontal dimensions, of a few millimetres at most relative to the finish, enabling forging with no losses of energy due to friction on the walls of the impression. The movement-blank generally has rounder angles than the finish. Indeed, angles are the most difficult locations to fill in terms of forging.

The main benefit of stamping is a shaping of the internal structure of the steel, enhancing the properties of the material of the final part and resulting in superior mechanical characteristics.

The stamp is generally formed of two units: a lower unit and an upper unit which respectively comprises a lower die and an upper die (reference is also made to lower half-die and upper half-die). The lower die is a fixed part, whereas the upper die is generally a movable ram which stamps the part in order to distort it.

The finish ends the distortion of the material. The result comprises the rough part and the burr. The latter is excess material found all around the part and which ensures the impression is filled correctly. The burr is subsequently separated from the rough part thanks to a forging process: trimming.

However, such a trimming operation is onerous, time-consuming, and helps increase the overall cost of the formation process of the part as a whole. Further steps of finishing the part, also onerous, can imply the formation of particular angles on the final part (via for example several iterations), corrections on the external shape of the part, producing undercuts, etc.

SUMMARY OF THE INVENTION

The aim of the invention is therefore that of remedying the drawbacks of the prior art by providing a swaging tool (forming a stamp) to implement an inexpensive stamping process, which enables an easy formation of the final part and which requires few or virtually no burrs to remove, or correction on the external shape of the part, such that the finish of this part is simplified and inexpensive.

To this end, the present invention relates to a swaging tool forming a stamp for a metal movement-blank, the swaging tool comprising a lower unit and an upper unit, the lower unit being arranged to be able to form a bed intended to receive the metal movement-blank, the upper unit being equipped with an upper die, intended to stamp the metal movement-blank in place in the bed of the lower unit, and mounted movable along a movement axis. The lower unit includes pliers formed by two mounted movable arms, in a perpendicular plane to the movement axis, between an opening position wherein the two arms of the pliers are moved apart, enabling a placement of the metal movement-blank between these two arms, and a closing position wherein the two arms of the pliers are moved closer together and then define, along the movement axis, an upper region and a lower region of the bed separated by an opening, the dimensions of which are less than the corresponding dimensions of the lower region and the corresponding dimensions of the upper region of the bed, the two arms in their closing position forming, at least in said upper region of the bed, a lower die for the metal movement-blank.

According to an advantageous embodiment of the invention, respective parts of the two arms defining an upper region of said bed form a lower die for the metal movement-blank. Such a lower die thus makes it possible to partially impart the final shape to the metal movement-blank. According to this embodiment, the metal movement-blank indeed does not have the same initial shape as its final shape in respect of the part of the metal movement-blank located in said upper region of said bed, and the swaging of the metal movement-blank by the upper die thus induces a distortion of the upper part (also known as the head) of the movement-blank, more specifically at least one upper distortion of a hollow intermediate part. It should be noted that the term "bed for receiving the metal movement-blank" is not to be understood as having an identical shape to that of the initial shape of the movement-blank, but as a delimited space for receiving this movement-blank which defines at least in part a final shape of a part obtained after swaging.

According to an advantageous embodiment of the invention, respective parts of the two arms defining said upper part of said bed form a lower die for the metal movement-blank. Such a lower die thus makes it possible to partially impart the final shape to the metal movement-blank. According to this embodiment, the metal movement-blank indeed does not have the same initial shape as its final shape in respect of the part of the metal movement-blank located in said upper part of said bed, and the swaging of the metal movement-blank by the upper die thus induces a distortion of the upper part (also known as the head) of the movement-blank, more specifically at least one upper distortion of a hollow intermediate part. It should be noted that the term "bed for receiving the metal movement-blank" is not to be understood as having an identical shape to that of the initial shape of the movement-blank, but as a delimited space for receiving this movement-blank which defines at least in part a final shape of a part obtained after swaging.

The swaging tool furthermore includes an actuator configured to close the arms of the pliers before swaging.

According to a particular technical feature of the invention, the upper unit is mounted movable relative to the lower unit, along said movement axis, and preferably the actuator is mounted on the upper unit and configured to move the arms of the pliers closer together to the closing position thereof.

Preferably, the actuator mounted on the upper unit is a first actuator, and the lower unit comprises a second actuator formed by a spring connecting two shanks of the pliers, particularly a linear extension spring.

According to an advantageous technical feature of the invention, the movement travel of the upper unit with respect to the lower unit and the respective shapes of the first actuator, flared zones and cylindrical zones of the pliers are such that moving the two arms of the pliers intended to partially receive the metal movement-blank closer together is synchronised with the swaging of the upper die on the metal movement-blank in such a way that these two arms reach their closing position and thus form said part of said bed before the swaging takes place.

According to particular features, the pliers comprises two branches which are hinged and formed respectively by the two arms and the two shanks, these two branches being hinged at a junction located between the two arms and the two shanks without however intersecting, each of the two shanks defining on an upper side a flared zone extending into a cylindrical zone on the lower side, the two flared zones and the two cylindrical zones of the pliers being arranged facing one another. The first actuator has a shape which is configured to be able to firstly press, when the upper unit is moved closer to the lower unit, on the two flared zones of the pliers in such a way as to move the two shanks apart and thus move the two arms of the pliers closer together up to their closing position, so as to form said part of said bed for receiving the metal movement-blank, and to subsequently finish its travel between the two cylindrical zones of the pliers while holding the two arms in said closing position.

A further aspect of the invention relates to a stamping process, implemented by a swaging tool as described above, the pliers being initially in their opening position wherein the two arms of the pliers are moved apart, the process including the following steps:

- providing a metal movement-blank equipped with an upper part and a lower part;
- placing the metal movement-blank between the two arms of the pliers; then
- moving the two arms of the pliers closer together, to the closing position of the pliers, so as to form a part of said bed for receiving the metal movement-blank, the upper part and the lower part of this metal movement-blank then being located respectively on both sides of the opening, formed between the two arms, along said movement axis;
- moving the upper unit, along said movement axis, towards the lower unit, and swaging the upper die on the metal movement-blank; finally
- moving the two arms of the pliers apart to the opening position of the pliers; and
- ejecting, from the lower unit, the final part obtained after swaging the metal movement-blank.

Such a stamping process is simplified with respect to the process of the prior art, and helps save time as requiring few or virtually no burrs to remove, or correction on the external shape of the final part, which has a groove on the edge thereof and optionally, under this groove, a fluted lower part. The final part, once stamped, only requires a possible slight re-emptying at the end of the process, as well as a polishing (but no correction on the external shape of the part).

Preferably, the stamping process is performed at ambient temperature.

According to an advantageous technical feature of the invention, the step of swaging the upper die on the metal movement-blank is synchronised and therefore at least partially simultaneous with the closure of the two arms of the pliers, such that the two arms of the pliers reach the closing position, defining the upper and lower regions of said bed (10), after the upper unit has started undergoing a movement along said movement axis and before the swaging takes place. This advantageous variant is preferred. However, in a further variant, the closing of the pliers, namely of the two arms thereof, can take place before the swaging step, i.e. before the upper unit is continually movement towards the movement-blank to perform swaging of this movement-blank.

According to an embodiment example of the invention, during the step of swaging the upper die on the metal movement-blank, a relief pattern, in particular a logo, is produced on a top front surface of the movement-blank head, the final shape of the top front surface of the head being defined during said swaging.

Preferably, the metal movement-blank is a horological crown movement-blank, said upper part of the metal movement-blank forming a crown head movement-blank.

In a particular embodiment, the metal movement-blank has an overall cylindrical shape defining a symmetry of revolution, the upper part of the metal movement-blank forming a substantially circular movement-blank head, the radius of the upper part being less than the radius defined by the bottom of each of the flutes of a fluted lower part of the metal movement-blank relative to the axis of revolution. This enables easy production of the flutes on the lower part of the metal movement-blank, particularly by linear milling or drawing, without degrading the head of the metal movement-blank, then giving the head of the final part its final shape by stamping.

A part advantageously obtained by the stamping process with the swaging tool according to the invention is a horological crown, the metal movement-blank is a horological crown movement-blank, said upper part of the metal movement-blank forming a crown head.

Advantageously, the metal movement-blank includes a hollow intermediate portion separating the lower and upper parts of the metal movement-blank, the lower part of the metal movement-blank forming a fluted part, equipped with a plurality of longitudinal flutes extending on the edge thereof, and the intermediate portion forming a groove on the edge of the metal movement-blank.

In particular, the groove has an inclined "V"-shaped transversal profile relative to the movement axis of the upper unit. The lower surface of the groove, in particular the angle at the horizontal plane, is substantially determined during the machining of the metal movement-blank, whereas the upper surface of the "V", on the side of the upper part of the metal movement-blank, is defined finally during the swaging of the upper die on this movement-blank.

In this document, the terms "horizontal", "vertical" or "transversal", "lower", "upper", "top", "bottom", "side" are defined relative to the orientation of the swaging tool according to the invention. In particular, in this application, the term "vertical" denotes an orientation along a movement axis of the upper unit of the swaging tool, whereas the term "horizontal" denotes an orientation or a plane perpendicular to this movement axis.

BRIEF DESCRIPTION OF THE FIGURES

The aims, advantages and features of the swaging tool according to the invention, and of the associated stamping process, will become more apparent in the following description of various non-limiting embodiments, illustrated by the drawings wherein.

DETAILED DESCRIPTION OF THE INVENTION

Figure 1:
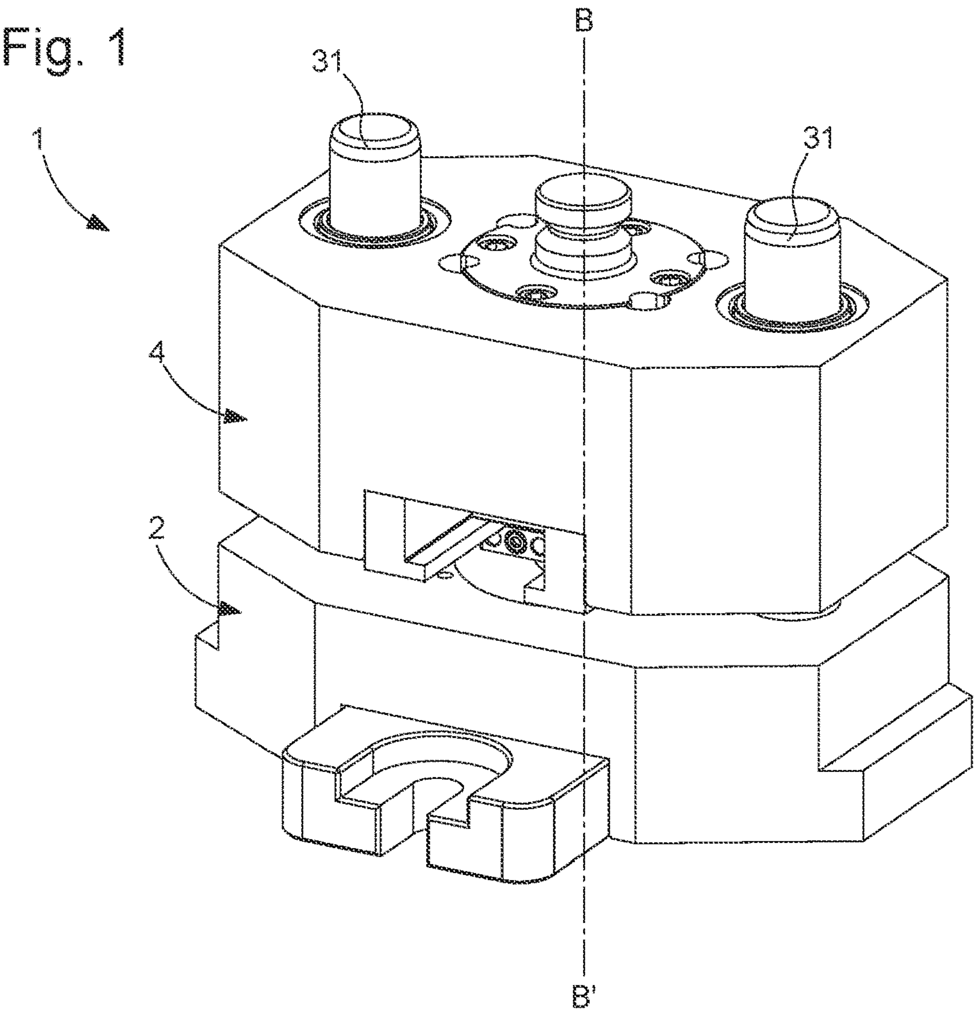
FIG. 1 is a perspective view of a swaging tool according to an embodiment of the invention, the swaging tool comprising pliers equipped with two arms mounted movable between an opening position of the pliers and a closing position of the pliers.

In FIGS. 1 to 12, a swaging tool 1 forming a stamp, according to a particular embodiment of the invention, is illustrated. The swaging tool 1 includes a lower unit 2, an upper unit 4, a first actuator 6 and a second actuator 8.

Figure 20:
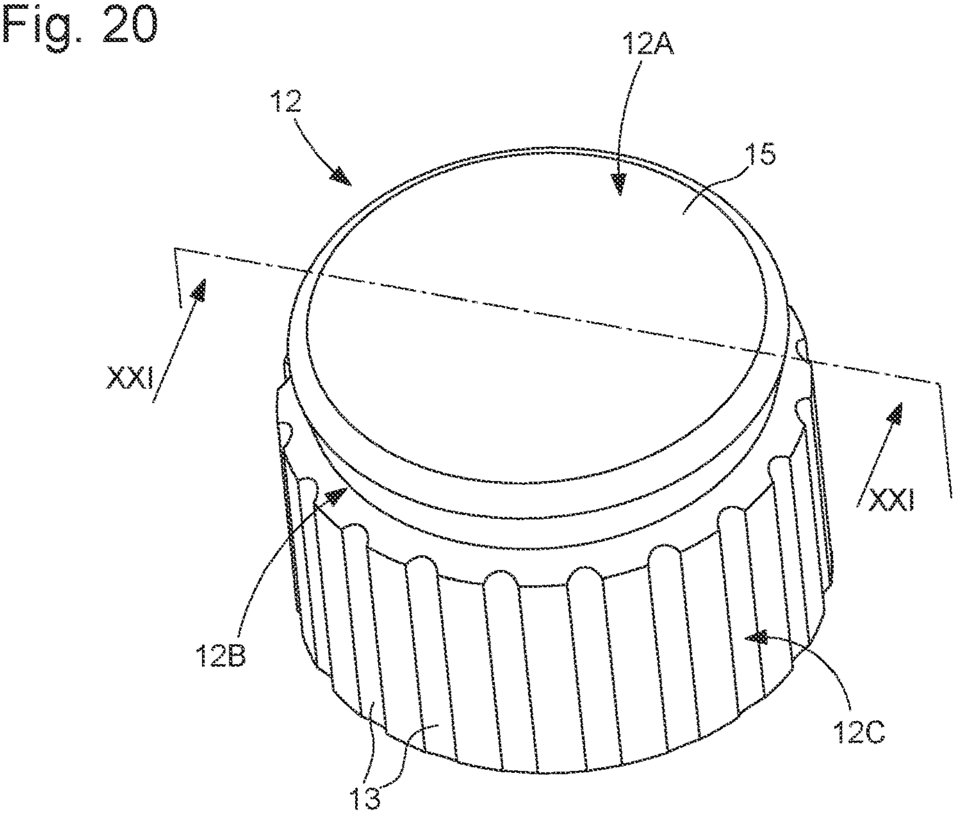
FIG. 20 is a perspective view of the metal movement-blank of FIG. 4 according to an embodiment example, before stamping by the swaging tool.
Figure 21:
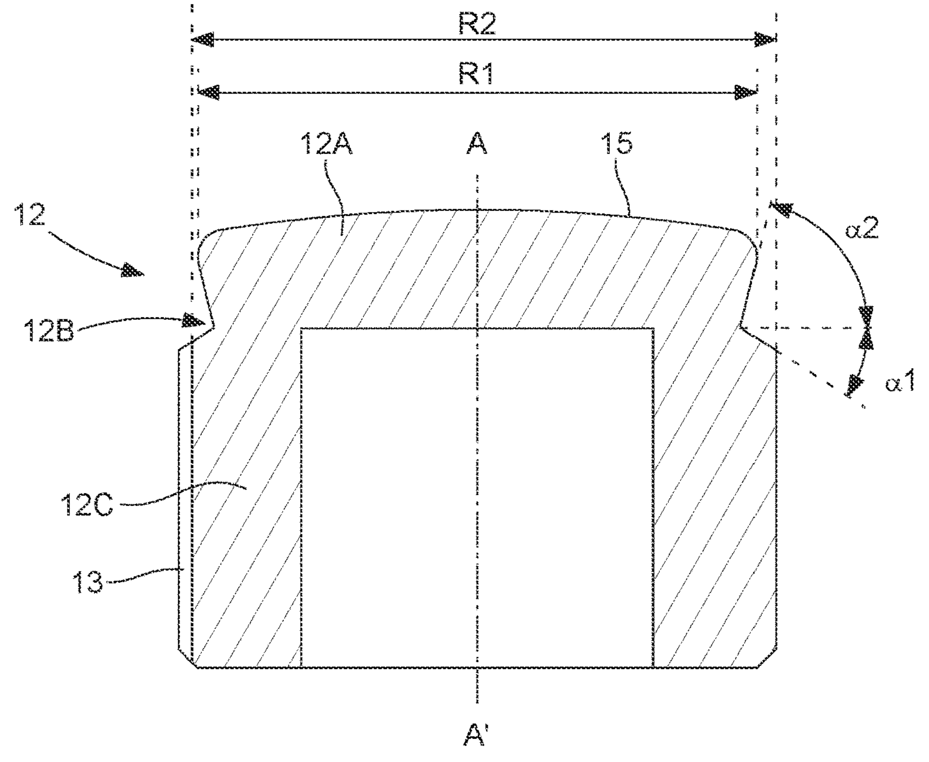
FIG. 21 is a sectional view, along the vertical sectional plane XXI-XXI, of the metal movement-blank of FIG. 20.

As illustrated in FIGS. 5 to 12, the lower unit 2 is arranged to form a bed 10 receiving a metal movement-blank 12. An example of such a movement-blank 12 is shown in FIGS. 20 and 21. According to this particular example, the metal movement-blank 12 is a horological crown movement-blank including an upper part 12A forming a crown head, a fluted lower part 12C, and an intermediate portion/part 12B separating the upper and lower parts 12A, 12C. The lower part 12C of the movement-blank 12 is thus equipped with several longitudinal flutes 13 which extend on the edge thereof and which are equidistributed angularly on this edge. The lower part 12C of the movement-blank 12 forms for example a hollow cylinder body, previously hollowed. The intermediate portion 12B of the movement-blank 12 forms a groove (also known as "undercut") on the edge of the movement-blank 12. The groove, preformed on the metal movement-blank 12, has a hollow longitudinal profile, more specifically with an asymmetrical "V" shape, inclined relative to the vertical direction. As illustrated in FIG. 21, the angle at the horizontal plane $\alpha\mathbf{1}$ formed by the surface of the "V" on the side of the fluted lower part 12C of the movement-blank 12 is preferably less than 45 degrees, for example of the order of 32 degrees. The angle at the horizontal plane $\alpha\mathbf{2}$ formed by the surface of the "V" on the side of the upper part 12A of the movement-blank 12 is greater than 45 degrees, for example of the order of 76 degrees. The movement-blank head 12A has a substantially domed top front surface 15, ending in a slight end rounding. It is to be noted that the definition of an intermediate portion of the movement-blank is specific to the described embodiment but is not necessary for the invention, which requires an upper part and a lower part for the movement-blank. Thus, it would be possible to divide the intermediate portion in a lower zone and an upper zone and to incorporate these lower zone and upper zone respectively in the lower part and upper part of the movement-blank.

Figure 10:
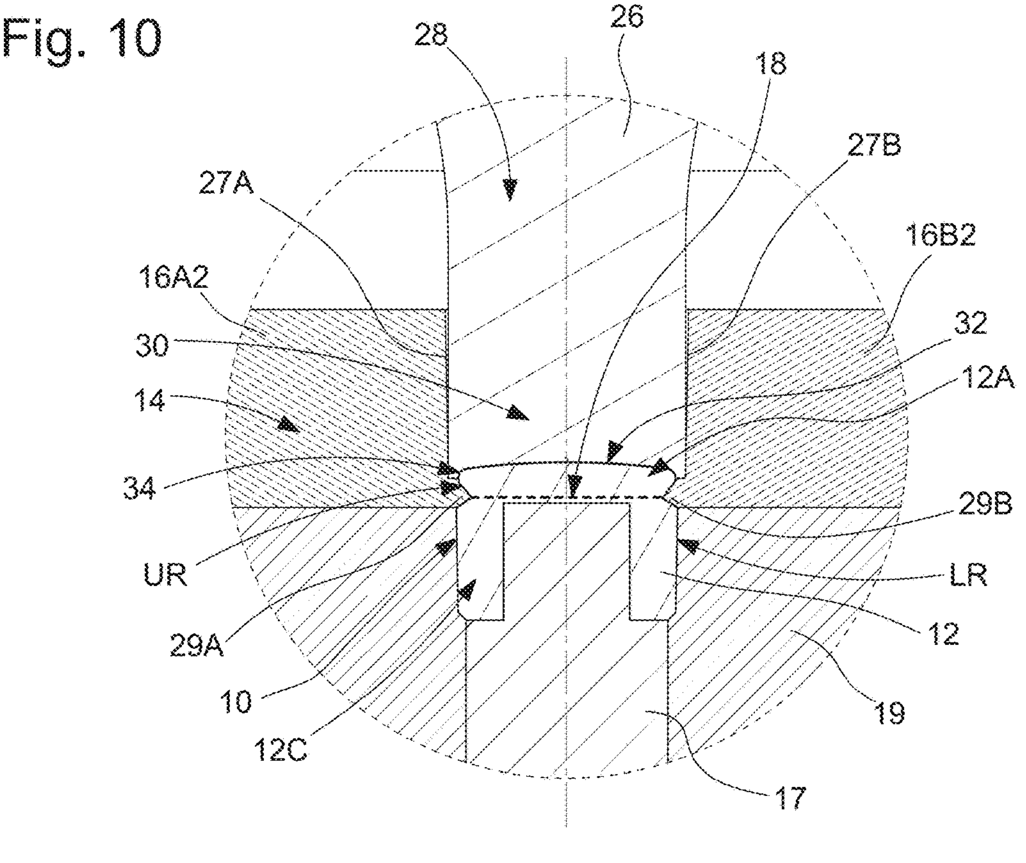
FIG. 10 is an enlarged view showing an embodiment detail of the swaging tool of FIG. 9.
Figure 11:
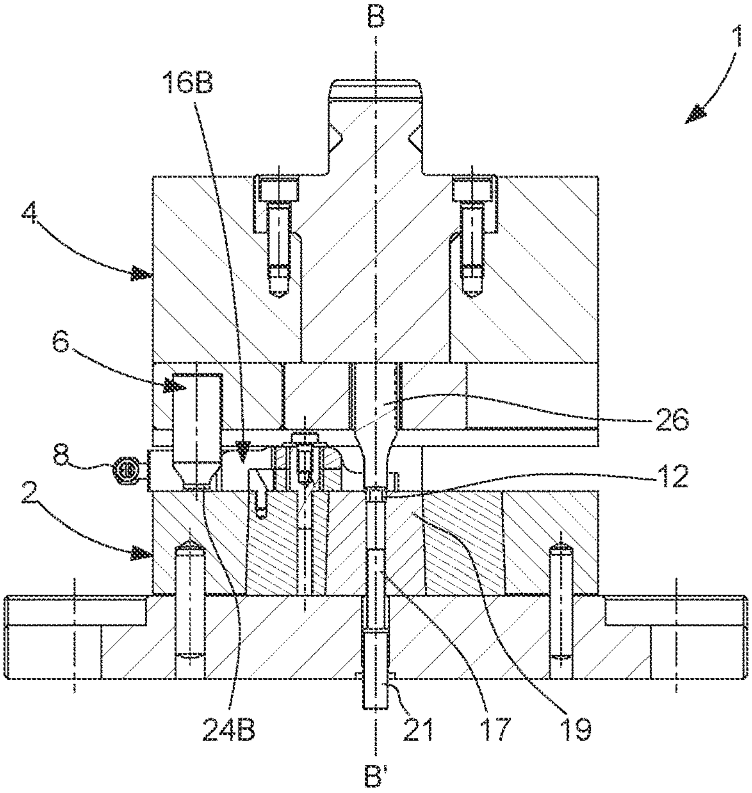
FIG. 11 is a sectional view, along the vertical sectional plane VII-VII, of the swaging tool of FIG. 4, in the closing position of the pliers.

The lower unit 2 includes pliers 14 equipped with two branches 16A, 16B. Preferably, as illustrated in FIGS. 5 to 7 and 9 to 11, the lower unit 2 also includes a support rod 17 and an external guide 19 for angular positioning of the metal movement-blank 12 and/or for holding the metal movement-blank 12 in a radial position. The two branches 16A, 16B of the pliers 14 are mounted movable in a horizontal plane, between an opening position of the pliers 14, illustrated in FIGS. 5 to 8, and a closing position of the pliers illustrated in FIGS. 9 to 12. In the opening position of the pliers 14, the two arms 16A2, 16B2 are moved apart, enabling a placement of the metal movement-blank 12 between these two arms. As illustrated in FIG. 10, in the closing position of the pliers 14 the two arms 16A2, 16B2 are moved closer together and then define an upper region UR of the bed 10, for receiving the upper part 12A of the metal movement-blank 12, and an opening 18. The opening 18 separates the lower region LR and the upper region UR of the bed, these lower region and upper region being on both sides of this opening 18 along the vertical direction defined by the central axis B-B'. The dimensions of the opening 18 are less than corresponding dimensions of the lower region LR and corresponding dimensions of the upper region UR of the bed. The dimensions of the opening 18 are also less than the corresponding dimensions of the upper part 12A and the lower part 12C of the metal movement-blank 12 which are located respectively in the lower region LR and the upper region UR of the bed 10 on both sides of the opening 18, along the vertical direction, once the metal movement-blank is in place in the lower unit 2 and the pliers 14 are in the closing position. The term "bed for receiving the metal movement-blank” is not to be understood as having an identical shape to that of the initial shape of the movement-blank 12, but as a delimited space for receiving this movement-blank.

Figure 12:
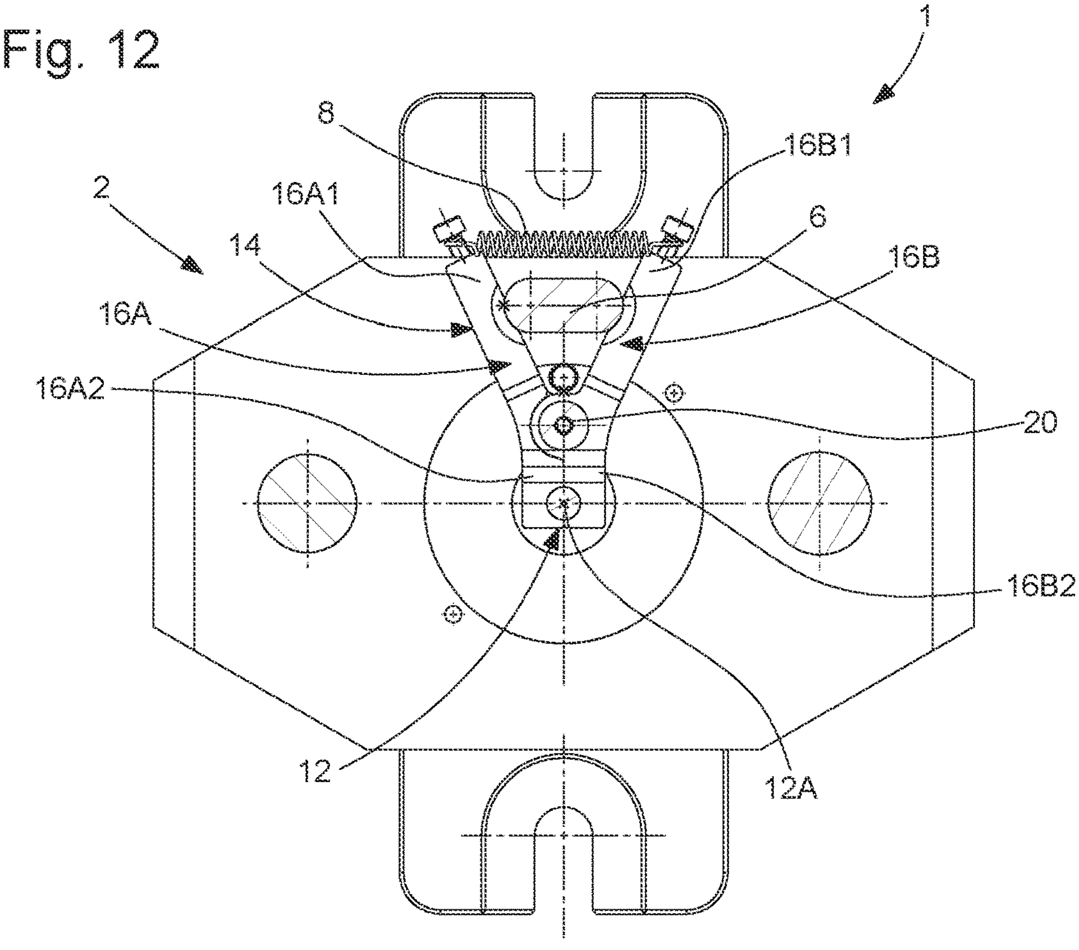
FIG. 12 is a sectional view, along the horizontal sectional plane XII-XII, of the swaging tool of FIG. 9.
Figure 13:
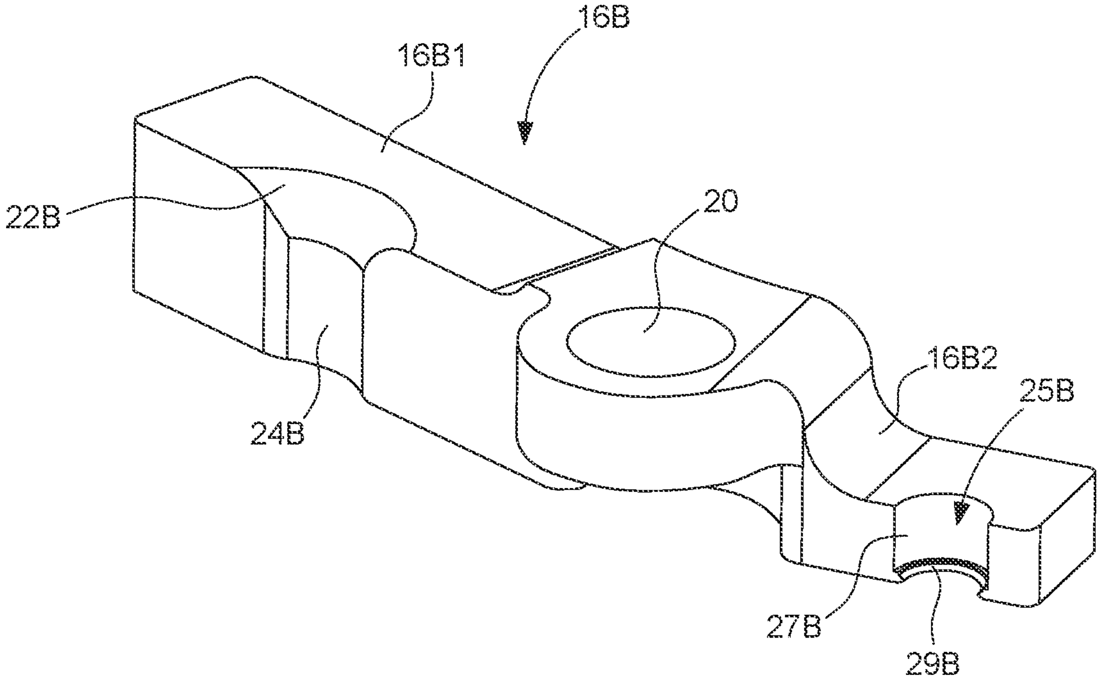
FIG. 13 is a perspective view of a first arm of the pliers of FIG. 1.
Figure 14:
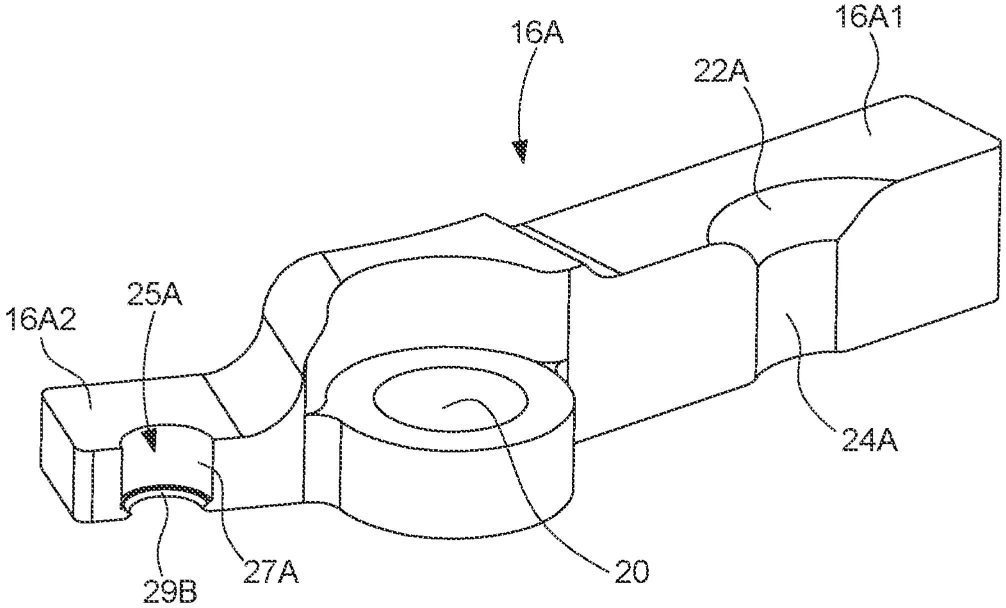
FIG. 14 is a perspective view of the second arm of the pliers of FIG. 1.
Figure 15:
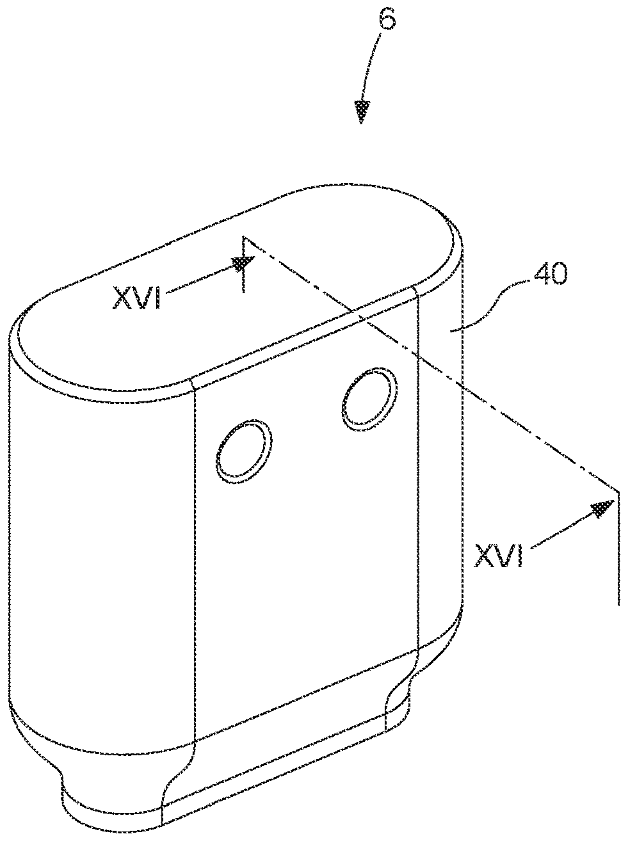
FIG. 15 is a perspective bottom view of the first actuator of FIG. 8.
Figure 16:
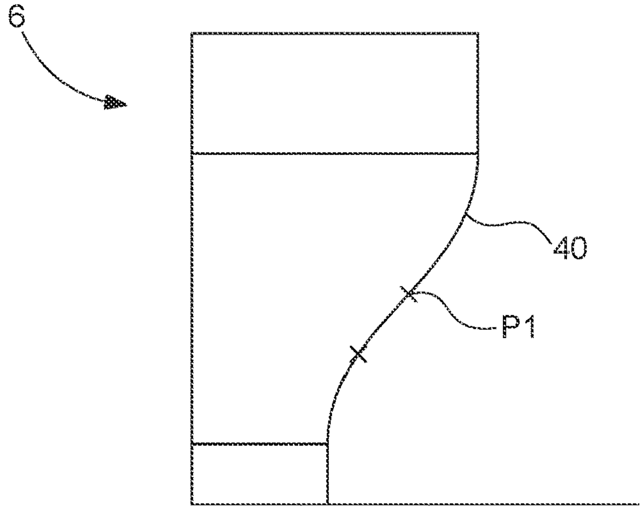
FIG. 16 is a sectional view, along the vertical sectional plane XVI-XVI, of the first actuator of FIG. 15.
Figure 17:
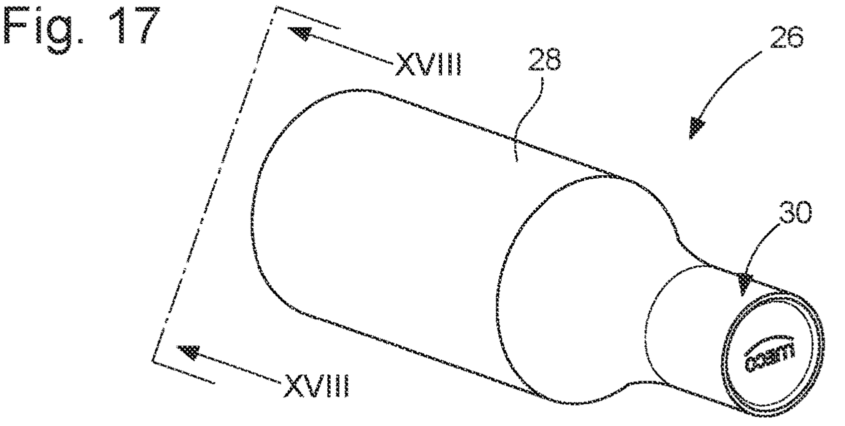
FIG. 17 is a perspective view of the upper die of FIG. 4.
Figure 18:
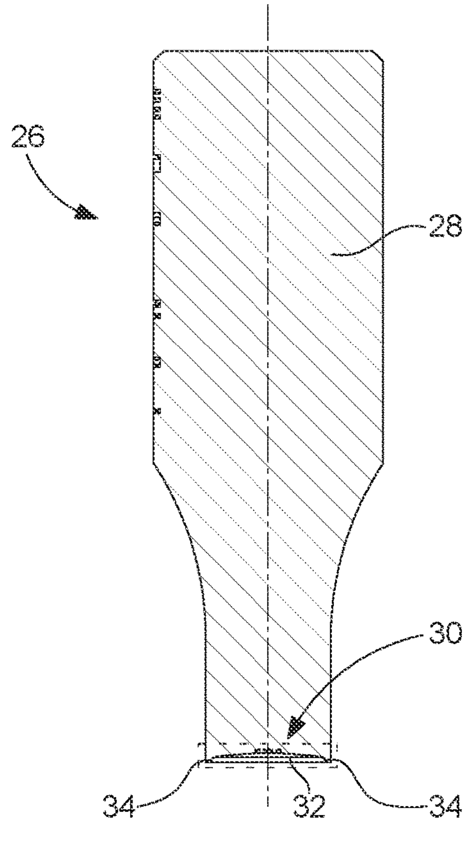
FIG. 18 is a sectional view, along the vertical sectional plane XVIII-XVIII, of the upper die of FIG. 17.

In the particular embodiment illustrated in FIGS. 8, 12, 13 and 14, each of the two branches 16A, 16B of the pliers 14 includes a shank 16A1 and an arm 16A2, respectively 16B1, 16B2. The two branches 16A, 16B of the pliers are hinged at a junction 20 located between the two shanks 16A1, 16B1 and the two arms 16A2, 16B2, without the two branches intersecting however. As seen in FIGS. 13 and 14, a first shank 16A1, respectively 16B1 of each branch 16A, 16B of the pliers defines on its top surface a flared zone 22A, respectively 22B extending downwards into a substantially cylindrical zone 24A, respectively 24B. The arm 16A2, respectively 16B2 of each branch 16A, 16B of the pliers 14 defines, in a hollowed part 25A, respectively 25B of the arm, a part of the bed 10 for receiving the metal movement-blank 12, as well as a part of the opening 18. The two flared zones 22A, 22B as well as the two cylindrical zones 24A, 24B of the pliers 14 are arranged facing one another. As described in more detail hereinafter, the first actuator 6 has a suitable shape to be able to actuate the pliers. Each hollowed part 25A, 25B, belonging to one of the arms 16A2, 16B2 of each branch 16A, 16B of the pliers 14, has an upper part 27A, 27B and a lower part 29A, 29B, the latter being formed of a semi-circular crown (intended to partially form the final groove or undercut 11B of the movement-blank). The two lower parts 29A, 29B of the arms 16A2, 16B2 delimit the opening 18 and define, once the pliers 14 are in the closing position thereof, a part of the bed 10 for receiving the intermediate part 12B of the metal movement-blank 12 mentioned above. The two lower parts 29A and 29B form, in their closing position, a circular crown which extends radially in the direction of the central vertical axis B-B'. More specifically, the opening 18 is located at the level of the internal line defined by the smallest radius of the circular crown. The two lower parts 29A, 29B of the two arms 16A2, 16B2 also form a lower die for the movement-blank 12.

The support rod 17 is mounted vertically movable and is connected to an ejector 21 (seen in FIGS. 5, 7, 9 and 11). The support rod 17 (whereon the metal movement-blank 12 is initially placed) forms an internal guide for positioning the metal movement-blank 12 and is configured so as to make it possible to eject the metal movement-blank 12 of the lower unit 2 after swaging on the metal movement-blank 12.

The lower unit 2 (apart from the pliers 14) consists for example of hard metal. The pliers 14 consist for example of tool steel.

The upper unit 4 includes an upper die 26 and is mounted movable relative to the lower unit 2, along a vertical movement axis B-B'. For this purpose, the upper unit 4 is for example mounted on the lower unit 2 via two vertical ball cages 31 (seen in FIGS. 1, 2, 4, 5 and 9) making it possible to guide the upper unit 4 in vertical translation. The upper die 26, rigidly connected to the upper unit 4, is therefore mounted movable along this vertical movement axis B-B', and is configured to swage the metal movement-blank 12 (more specifically its head 12A) in place in the bed 10 of the lower unit 2.

As illustrated in FIGS. 10 and 17 to 19, the upper die 26 takes for example the form of a ram having a substantially frustoconical body 28, said body 28 being equipped with an end portion 30 intended to come into contact with the movement-blank head 12A when swaging. The end portion 30 is equipped with a hollow internal die 32 delimited by an annular rim 34 (here circular). The impression 36 of a relief pattern, in particular the impression of a logo, is for example defined in the bottom of the hollow internal die 32. The upper die 26 is thus configured so as to produce a relief pattern 38 (seen in FIG. 22), in particular a logo, on the top front surface 15 of the movement-blank head 12A. The upper die 26 is also configured so as to define the final shape of this top front surface 15 during the swaging of the upper die 26 on the metal movement-blank 12. More specifically, as illustrated in FIG. 10, the end portion 30 of the upper die 26 is configured to be able to slide in the upper parts 27A, 27B of the two arms 16A2, 16B2 of the pliers 14 once the latter are in their closing position. The end portion 30 of the upper die 26 then extends upwards the part of the bed 10 for receiving the metal movement-blank 12 defined by the two arms 16A, 16B of the pliers 14; the annular rim 34, together with the hollow internal die 32, imparting a part of its final shape to the metal movement-blank 12. The upper die 26 consists for example of tool steel.

The first actuator 6 is mounted on the upper block 4 and is configured to close the arms 16A2, 16B2 of the pliers 14. More specifically, as illustrated in FIGS. 8, 12, 15 and 16, the first actuator 6 has a complementary shape to that of the flared zones 22A, 22B and the substantially cylindrical zones 24A, 24B of the pliers 14. The shape of first actuator 6 is such that the first actuator 6 is configured to be able to firstly press, when the upper unit 4 is moved closer to the lower unit 2, on the flared zones 22A, 22B of the pliers 14 in such a way as to move the two shanks 16A1 and 16B1 apart and thus move the two arms 16A2, 16B2 of the pliers closer together up to their closing position, so as to form said part of said bed for receiving the metal movement-blank, and to subsequently finish its travel between the two cylindrical zones 24A, 24B of the pliers 14, while holding the two arms in their closing position, until the upper die 26 performs the envisaged swaging. Thus, when the upper unit 4 moves down towards the lower unit 2 along the axis B-B' so that the upper die 26 swages the metal movement-blank 12, the first actuator 6 simultaneously moves down towards the upper surfaces of the two shanks 16A1, 16B1 of the pliers 14, inserted progressively into the flared zones 22A, 22B by separating the two shanks thanks to a radial force resulting from the transversal profiles of the flared zones and the actuator 6, then the shape of the actuator is provided such that it can slide freely between the cylindrical zones 24A, 24B on a last part of the travel of the upper unit before swaging, while holding the two arms 16A2 and 16B2 in their closing position. According to a preferential embodiment example illustrated in FIGS. 15 and 16, the shape of the first actuator 6 is such that a profile of the first actuator, in a vertical section along a continuous external surface 40, has an inflection point P1. This facilitates the closing kinematics of the two opposite arms 16A2, 16B2 of the pliers 14 intended to receive partially the metal movement-blank 12 by enabling a progressive closure of these two arms 16A2, 16B2.

Preferably, the movement travel of the upper unit 4 with respect to the lower unit 2 and the respective shape of the first actuator 6, flared zones 22A, 22B and cylindrical zones 24A, 24B of the pliers 14 are such that closing the two arms 16A2, 16B2 of the pliers 14 intended to partially receive the metal movement-blank 12 is synchronised with the swaging of the upper die 26 on the metal movement-blank 12, in such a way that these two arms 16A2, 16B2 reach their closing position, pressing against one another, and thus form an upper region of the bed 10 for receiving the metal movement-blank 12, before the swaging takes place. In this way, as the upper unit moves down towards the lower unit 2 along the axis B-B', and the upper die 26 moves closer to the metal movement-blank 12, the first actuator 6 acts upon the two shanks 16A1, 16B1 of the pliers 14 to progressively close the two arms 16A2, 16B2 such that these two arms reach their closing position, one against the other, just before swaging. Closing the two arms 16A2, 16B2 of the pliers 14 is thus synchronised with swaging the upper die 26 on the metal movement-blank 12.

Figure 2:
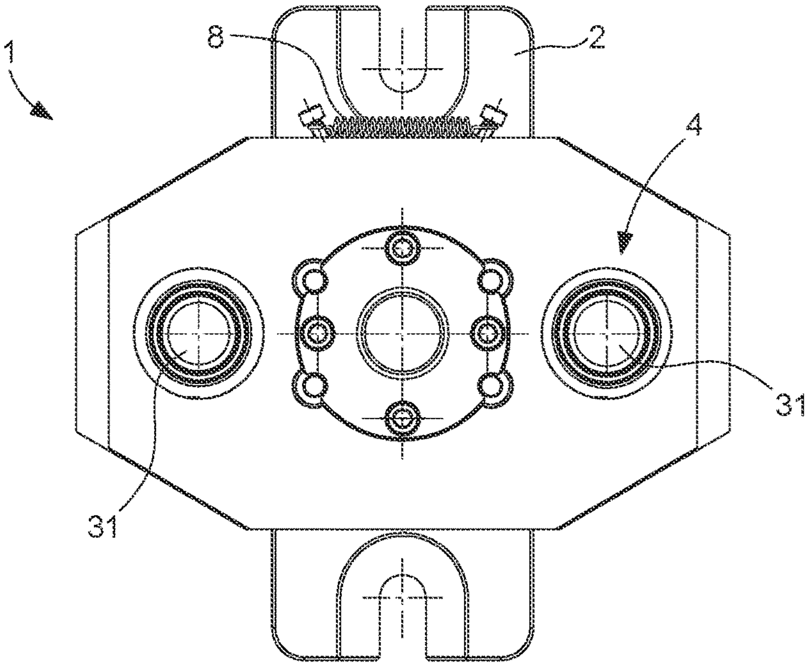
FIG. 2 is a top view of the swaging tool of FIG. 1.
Figure 3:
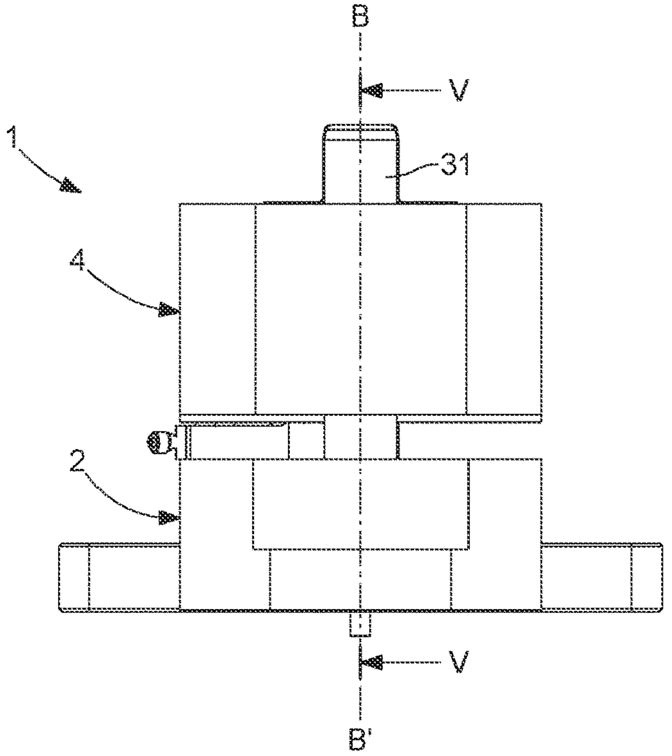
FIG. 3 is a lateral side view of the swaging tool of FIG. 1.
Figure 4:
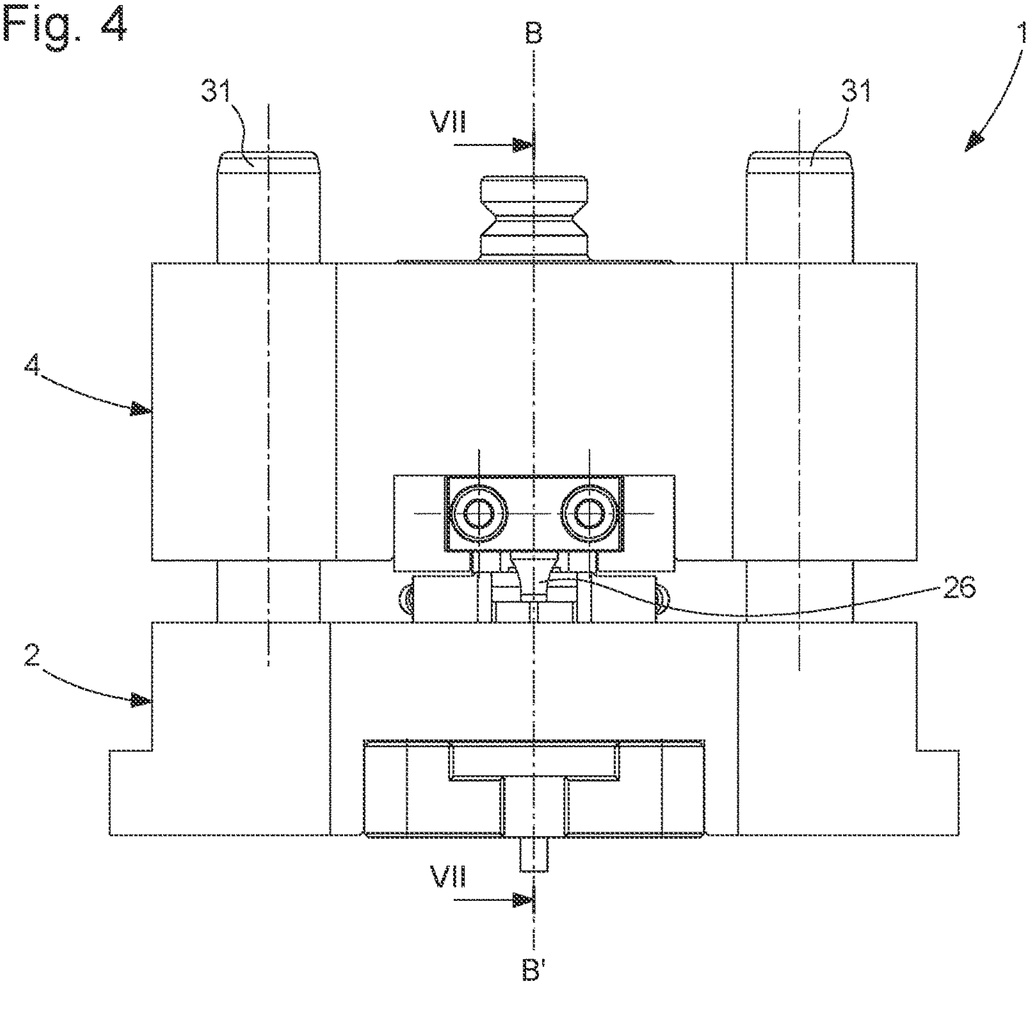
FIG. 4 is a front view of the swaging tool of FIG. 1, the swaging tool comprising an upper unit equipped with an upper die, and a lower unit intended to receive a metal movement-blank.
Figure 8:
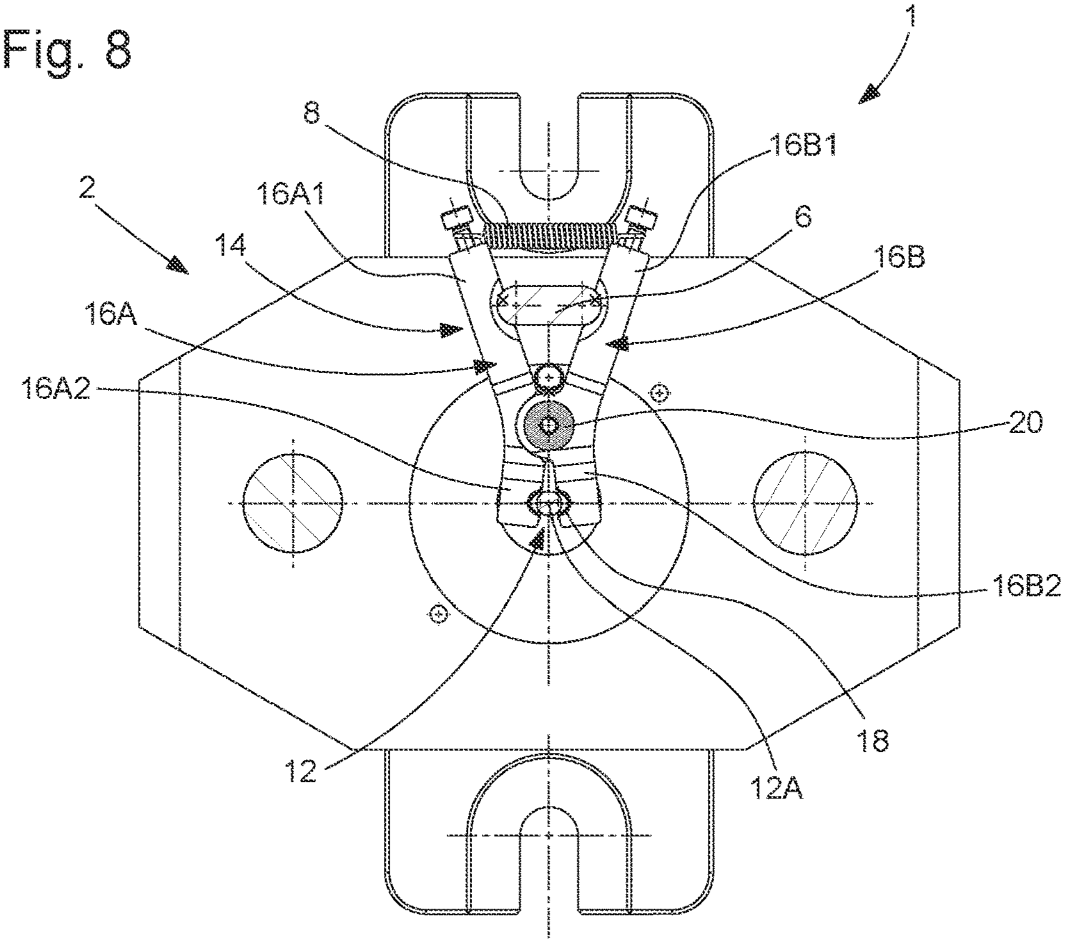
FIG. 8 is a sectional view, along the horizontal sectional plane VIII-VIII, of the swaging tool of FIG. 5, the swaging tool comprising a first actuator and a second actuator.
Figure 9:
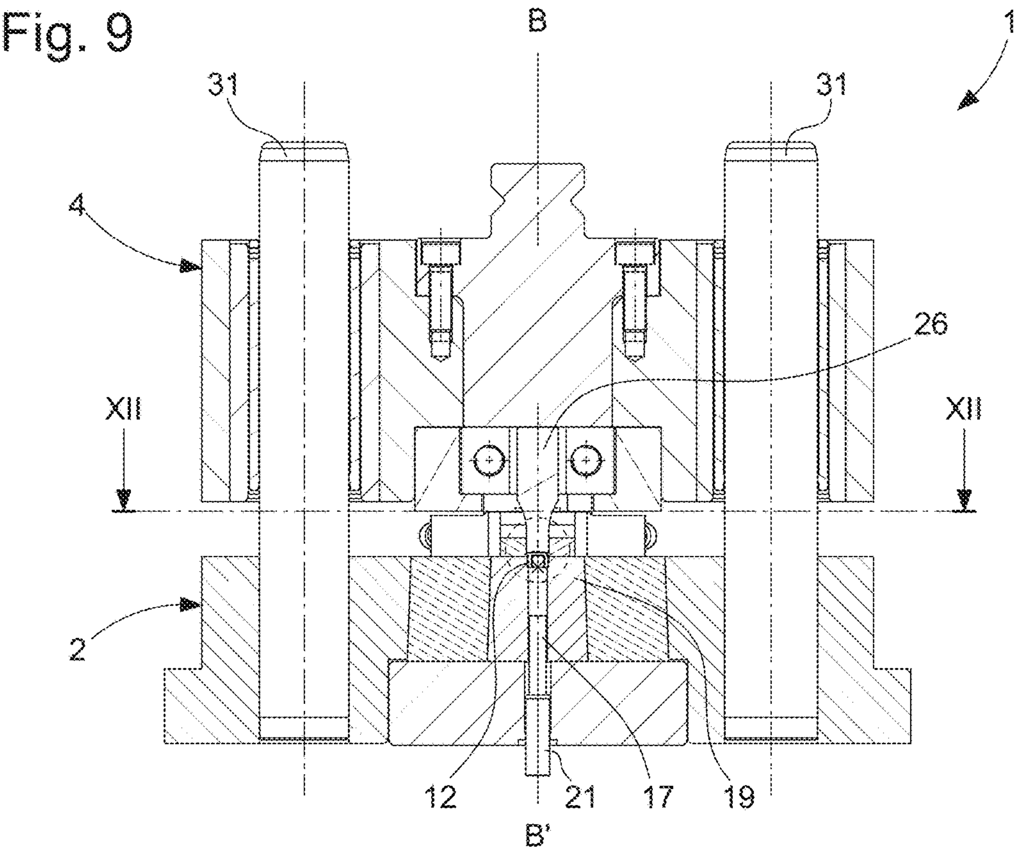
FIG. 9 is a sectional view, along the vertical sectional plane V-V, of the swaging tool of FIG. 3, in the closing position of the pliers.

In the particular embodiment example illustrated in FIGS. 2, 8 and 12, the second actuator 8 is a spring connecting the two shanks 16A1, 16B1 of the pliers 14, and exerting an elastic return force on these two shanks. The spring 8 is typically a linear extension spring.

The stamping process according to the invention, implemented by the swaging tool 1, will now be described with reference to FIGS. 4 to 12. The pliers 14 are initially in their opening position shown in FIGS. 4 to 8, wherein the two arms 16A2, 16B2 of the pliers 14 are separated from one another. The upper unit 4 is apart from the lower unit 2. Consequently, the upper die 26 is at a distance from the metal movement-blank 12 and the first actuator 6 is apart from the two shanks 16A1, 16B1 of the pliers 14.

Figure 5:
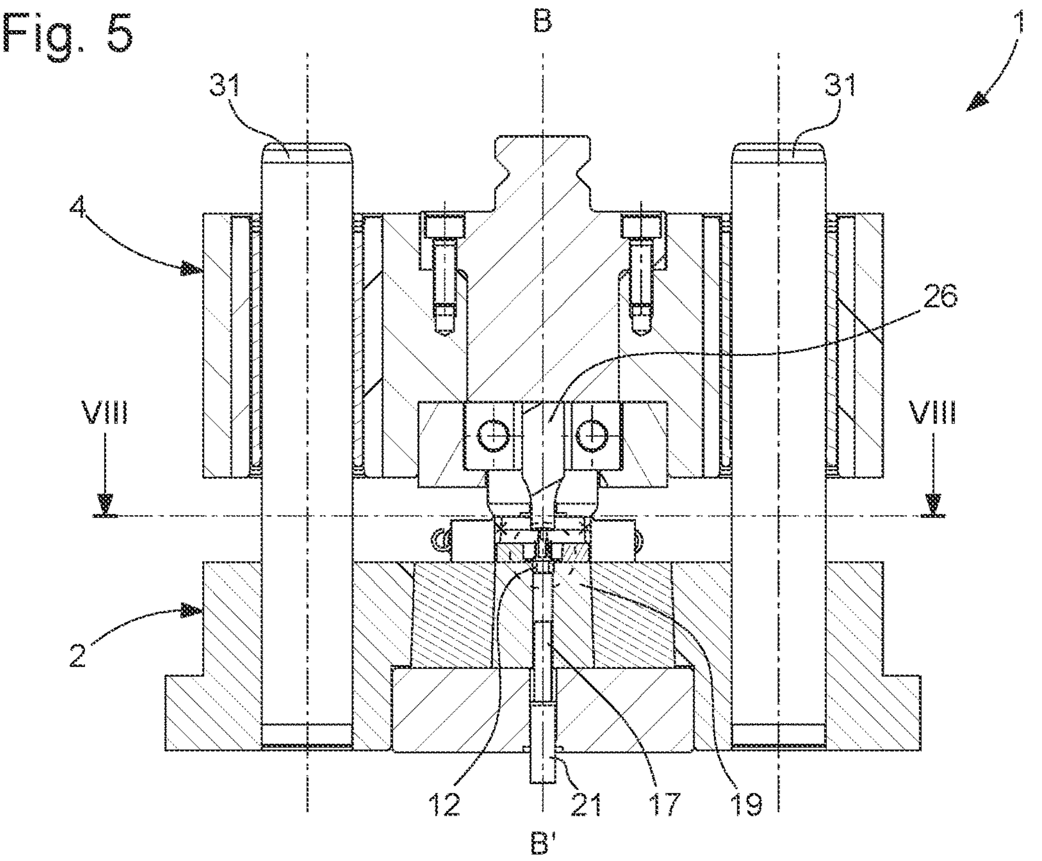
FIG. 5 is a sectional view, along the vertical sectional plane V-V, of the swaging tool of FIG. 3, in the opening position of the pliers.
Figure 6:
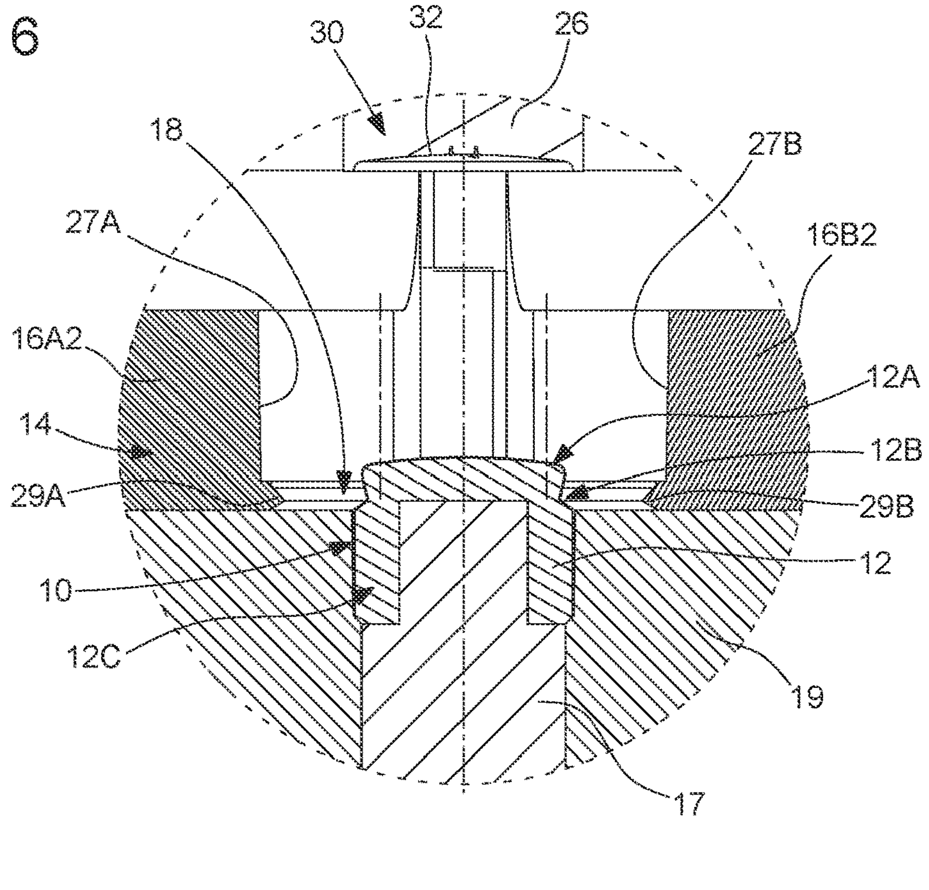
FIG. 6 is an enlarged view showing an embodiment detail of the swaging tool of FIG. 5.
Figure 7:
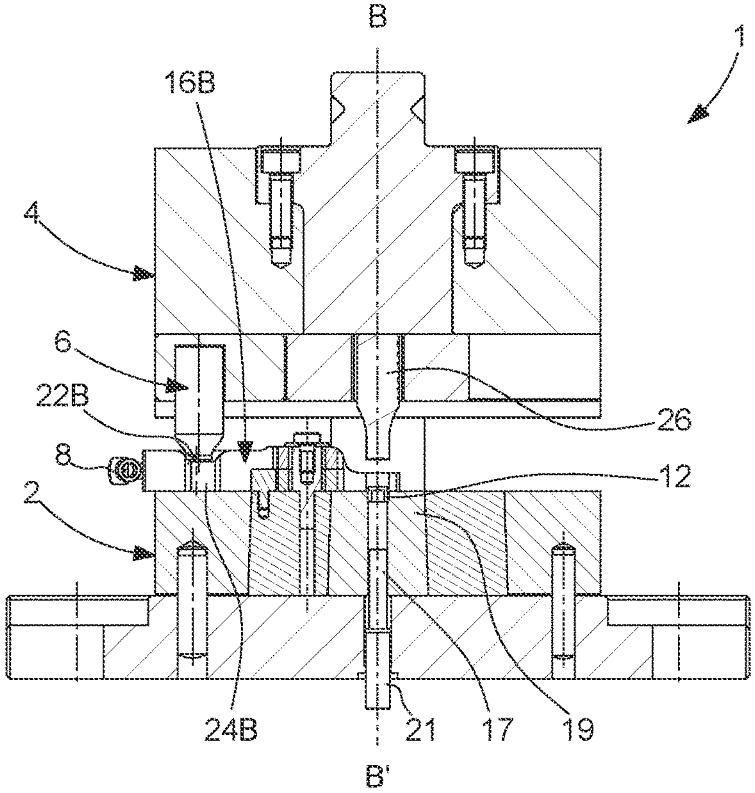
FIG. 7 is a sectional view, along the vertical sectional plane VII-VII, of the swaging tool of FIG. 4, in the opening position of the pliers.

The stamping process includes an initial step illustrated in FIGS. 5 and 6 during which the metal movement-blank 12 is placed in the lower region of the bed 10, whereas the pliers are in their initial open position (i.e. the two arms 16A2 and 16B2 are in their opening position). More specifically, the (hollowed) lower part 12C of the metal movement-blank 12 is placed on one hand inside the external guide 19, and on the other on the support rod 17, surrounding the end thereof. As seen in FIG. 6, the upper part 12A and the intermediate portion 12B of the metal movement-blank 12 project from the lower region of the bed 10 defined by the external guide 19 and are located between the two arms 16A2, 16B2 of the pliers 14, more specifically in a lower region of these two arms intended to form the opening 18.

The stamping process includes a subsequent step during which the upper unit 4 is moved vertically towards the lower unit 2, along the vertical axis B-B'. In doing so, the first actuator 6 is inserted progressively into the flared zones 22A, 22B of the pliers 14, thus acting upon the two shanks 16A1, 16B1 against the elastic return force exerted by the second actuator 8, to progressively close the two arms 16A2, 16B2 of the pliers 14. These two arms then move closer together to the closing position of the pliers 14, so as to form the upper region of the bed 10 for receiving the metal movement-blank 12 and the opening 18 mentioned above. In this state, the upper part 12A and the lower part 12C of the metal movement-blank 12 are then located respectively on both sides of the opening 18 along said movement axis B-B'. Once the pliers 14 are in their closing position, the first actuator 6 freely finishes its travel between the cylindrical zones 24A, 24B of the pliers 14 while holding the pliers in the closing position.

In parallel with this step, and in a synchronised manner with the descent of the first actuator 6 (therefore with the closure of the two arms 16A2, 16B2), the upper die 26 moves closer to the metal movement-blank 12 while moving along the vertical axis B-B'. As illustrated in FIG. 10, once the pliers 14 are in their closing position, the end portion 30 of the upper die 26 slides in the upper parts 27A, 27B of the two arms 16A2, 16B2 of the pliers 14. As shown in FIGS. 9 to 12, the end portion 30 of the upper die 26 then swages the metal movement-blank 12 during a subsequent step of the process. The annular rim 34 of the end portion 30, together with the hollow internal die 32, imparting a part of its final shape to the metal die 12, namely the final shape of the upper part 12A (crown head). The space delimited jointly by the two lower parts 29A, 29B of the arms 16A2, 16B2 of the pliers 14 above the opening 18 defined by these two lower parts 29A, 29B, when the pliers 14 are in their closing position, and by the annular rim 34 and the hollow internal die 32 of the end portion 30 of the upper die 26 thus forms the upper region UR of the bed 10 for receiving the metal movement-blank 12. The lower region LR of the bed 10 is formed by the support rod 17, the external guide 19 and the arms 16A2, 16B2 under the opening 18. Preferably, thanks to its imprint 36 shown in FIG. 19, the upper die 26 produces a relief pattern (in particular a logo) on the top front surface 15 of the movement-blank head 12A during this swaging step. The upper die 26 also defines the final shape of this top front surface 15 during the swaging of the metal movement-blank 12.

The stamping process includes a subsequent step during which the upper unit 4 is moved vertically away from the lower unit 2. In doing so, the first actuator 6 moves progressively up from the cylindrical zones 24A, 24B of the pliers 14 towards the flared zones 22A, 22B thereof, then comes out of these flared zones 22A, 22B. The shanks 16A1, 16B1 of the pliers 14 then move closer to one another on account of the elastic return force exerted by the second actuator 8, which triggers a separation of the two arms 16A2, 16B2 from one another to the opening position of the pliers 14, more specifically the two arms.

The stamping process includes a final step during which the final part 11 (obtained after stamping the movement-blank 12) is ejected from the lower unit 2, by actuating the ejector 21 and vertically moving the support rod 17 upwards, which triggers the ejection of the final part 11.

Figure 19:
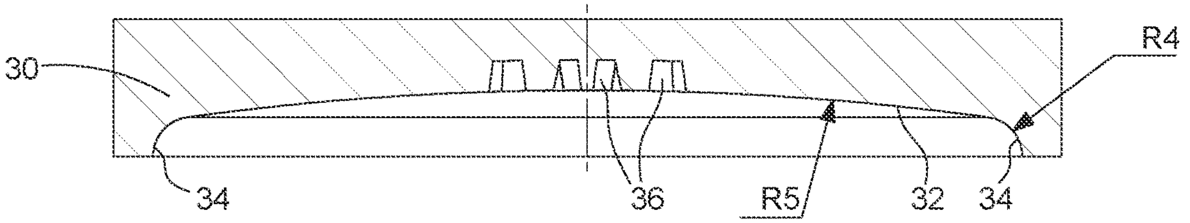
FIG. 19 is an enlarged view showing an embodiment detail of the upper die of FIG. 18.
Figure 22:
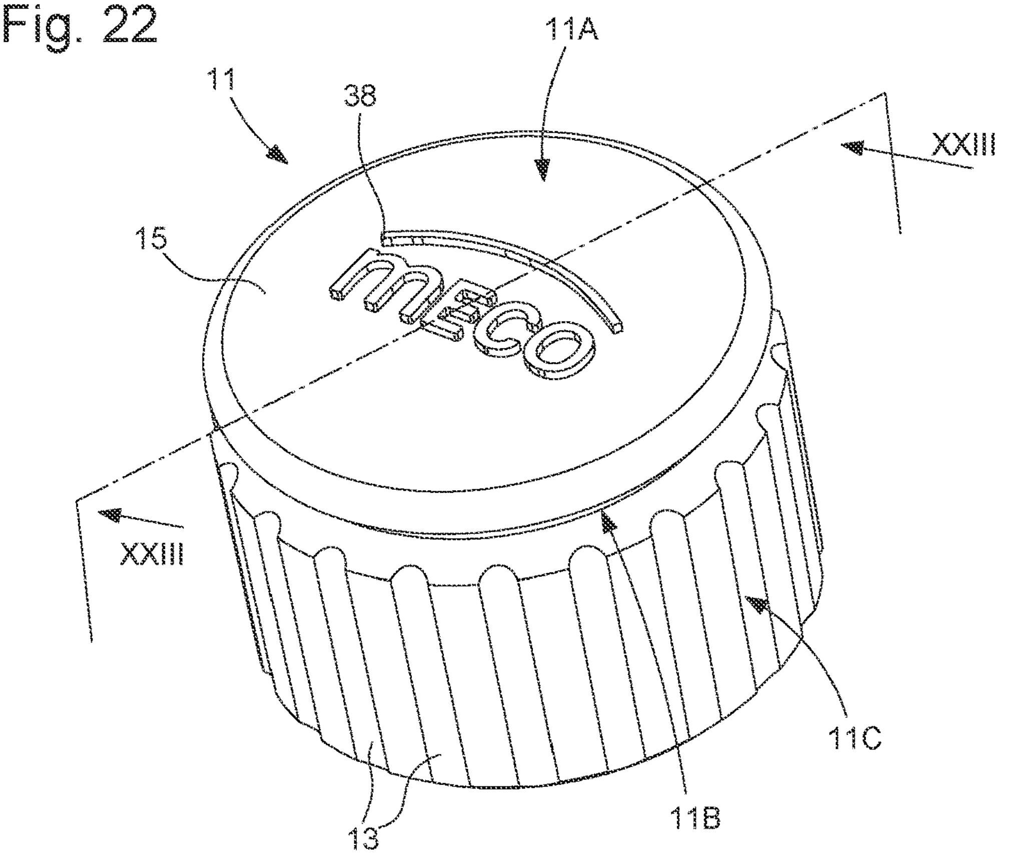
FIG. 22 is a perspective view of the metal movement-blank of FIG. 4 after stamping by the swaging tool, forming a final part according to an embodiment example.
Figure 23:
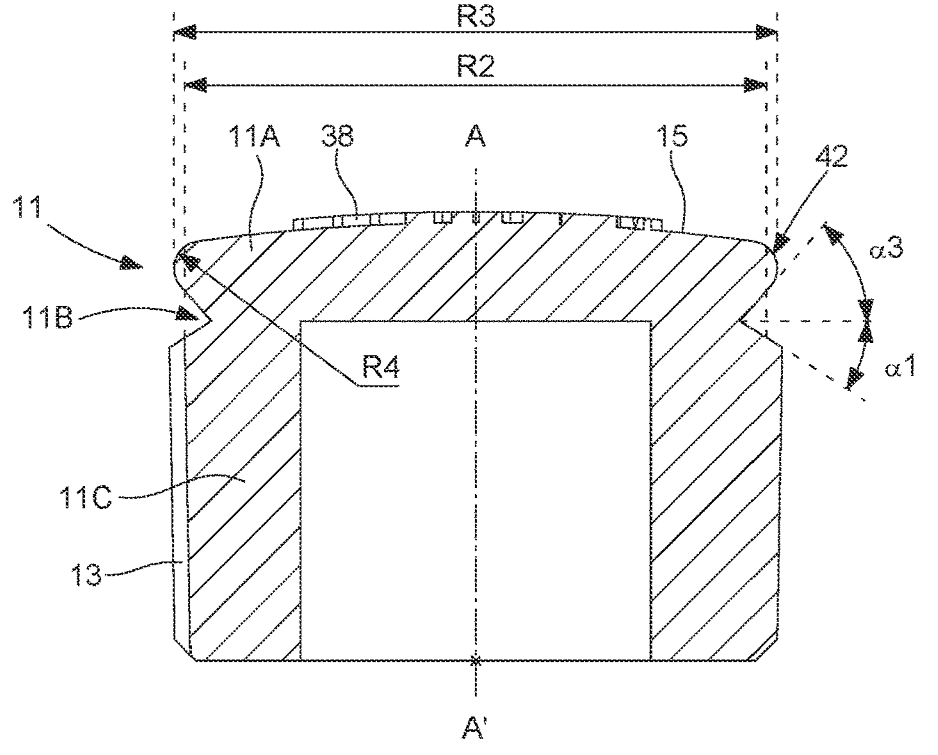
FIG. 23 is a sectional view, along the vertical sectional plane XXIII-XXIII, of the final part of FIG. 22.

An example of such a final part 11 obtained after stamping the metal movement-blank 12 is shown in FIGS. 22 and 23. According to this particular example, the final part 11 is a horological crown including a crown head 11A, a fluted lower part 11C, and an intermediate portion/part 11B separating the upper and lower parts 11A, 11B. The intermediate portion 11B of the part 11 forms a groove or "undercut" on the edge of the part 11. Relative to the initial groove 12B, this final groove 11B formed after stamping has a more pronounced hollow longitudinal profile, more specifically an asymmetrical "V"-shaped longitudinal profile with a reduced internal angle, this asymmetrical "V" profile being inclined at 90 degrees relative to the vertical direction. As illustrated in FIG. 23, the angle $\alpha 1$ at the horizontal plane formed by the internal surface of the "V"-shaped groove, on the side of the fluted lower part 11C, of the part 11, is preferably less than 45 degrees, this angle $\alpha 1$ remaining substantially equal to the angle corresponding to the metal movement-blank 12. The angle at the horizontal plane $\alpha 3$ formed by the top surface of the "V"-shaped groove on the side of the crown head 11A is preferably greater than 45 degrees, for example of the order of 50 degrees, and advantageously less than the corresponding angle $\alpha 2$ of the metal movement-blank. Indeed, during the swaging of the upper die 26 on the head 12A, the swaging expands the head 12A while it reduces the height thereof slightly, such that the final radius R3 of this head is greater than its initial radius R1 (shown in FIG. 21). The final radius R3 of the crown head 11A has thus become greater than the radius R2 defined by the bottom of each of the flutes 13 relative to the axis of revolution A-A' of the final part 11. The final crown head 11A has a slightly domed top front surface 15, ending in a rounded annular bulge 42. As illustrated in FIG. 19, the annular rim 34 of the end portion 30 of the upper die 26 makes it possible to form the upper part of the end bulge 42, of radius R4 for example substantially equal to 0.25 mm, whereas the lower part of the rounded annular bulge 42 is formed by the two lower parts 29A, 29B of the arms 16A2, 16B2 of the pliers 14, which form a lower die of the stamping tool. The hollow internal die 32 of the end portion 30 of the upper die 26 defines a curved shape, which is configured to form the slightly domed top front surface 15 of the crown head 11A. This curved shape of the hollow internal die 32 has a radius at the centre R5 for example substantially equal to 20 mm, this radius R5 being advantageously greater than the radius corresponding to the movement-blank 12.

In the particular embodiment example shown in FIGS. 22 and 23, the final part 11 has a relief pattern 38, in particular a logo, produced on the top front surface 15 of the crown head 11A.

The invention claimed is:

1. A swaging tool (1) forming a stamp for a metal movement-blank, the swaging tool comprising:

a lower unit (2) and an upper unit (4), the lower unit being arranged to be able to form a bed (10) intended to receive the metal movement-blank (12), the upper unit being equipped with an upper die (26), intended to swage the metal movement-blank in place in the bed (10) of the lower unit (2), and mounted movable along a movement axis (B-B');

wherein the lower unit (2) includes pliers (14) formed by two arms (16A2, 16B2) mounted movable, in a perpendicular plane to the movement axis (B-B'), between an opening position wherein the two arms of the pliers are moved apart, enabling a placement of the metal movement-blank between these two arms, and a closing position wherein the two arms (16A2, 16B2) of the pliers are moved closer together and then define, along the movement axis (B-B'), an upper region (UR) and a lower region (LR) of the bed (10) separated by an opening (18), the dimensions of the opening being less than corresponding dimensions of the lower region and corresponding dimensions of the upper region of the bed, the two arms in the closing position thereof forming, at least in said upper region of the bed, a lower die for the metal movement-blank.

2. The swaging tool (1) according to claim 1, wherein the swaging tool (1) includes an actuator (6) configured to move the two arms (16A2, 16B2) of the pliers (14) closer together up to their closing position before the upper die (26) swages the metal movement-blank (12) in place in the bed (10).

3. The swaging tool (1) according to claim 2, wherein the upper unit (4) is mounted movable relative to the lower unit (2), along said movement axis (B-B'); and wherein the upper unit (4) includes said actuator.

4. The swaging tool (1) according to claim 3, wherein said actuator is a first actuator (6), wherein the lower unit (2) comprises a second actuator (8) configured to be able to open the two arms (16A2, 16B2) of the pliers (14) when the first actuator is not acting upon the pliers and thus hold these two arms in the opening position thereof while the first actuator is not actuated.

5. The swaging tool (1) according to claim 4, wherein the pliers (14) comprise two branches (16A, 16B) which are hinged and formed respectively by the two arms (16A2, 16B2) and by two shanks (16A1, 16B1), these two branches being hinged at a junction (20) located between the two arms and the two shanks without intersecting however, each of the two shanks defining on a top side a flared zone (22A, 22B) extending into a cylindrical zone (24A, 24B) on the bottom side, the two flared zones and the two cylindrical zones of the pliers (14) being arranged facing one another; and wherein the first actuator (6) has a shape which is configured to be able to firstly press, when the upper unit (4) is moved closer to the lower unit (2), on the two flared zones of the pliers (14) in such a way as to move the two shanks (16A1, 16B1) apart and thus move the two arms (16A2, 16B2) of the pliers (14) closer together up to their closing position, so as to define said upper region (UR) and said lower region (LR) of the bed (10) for receiving the metal movement-blank (12), and to subsequently finish its travel between the two cylindrical zones (24A, 24B) of the pliers (14) while holding the two arms in their closing position.

6. The swaging tool (1) according to claim 5, wherein the movement travel of the upper unit (4) relative to the lower unit (2) and the respective shapes of the first actuator (6), the two flared zones (22A, 22B) and the two cylindrical zones (24A, 24B) of the pliers (14) are such that moving the two arms (16A2, 16B2) of the pliers (14) closer together is synchronised with the movement travel of the upper unit in such a way that these two arms reach their closing position before the swaging takes place.

7. The swaging tool according to claim 6, wherein a portion (30) of the upper die (26) is configured to be able to slide in an upper part (27A, 27B) of the two arms (16A2, 16B2) once in their closing position, this upper part (27A, 27B) extending said upper region of said bed (10) upwards.

8. The swaging tool according to claim 1, wherein the lower unit (2) further includes a support rod (17) configured to be able to support the metal movement-blank (12) and at least initially axially position the metal movement-blank, this support rod being mounted movable, along said movement axis (B-B'), so as to make it possible to eject a final part (11), consisting of the metal movement-blank once swaged, from the lower unit (2) after swaging the upper die (26) on the metal movement-blank (12).

9. The swaging tool according to claim 1, wherein the lower unit (2) further includes an angular positioning guide (19) for the metal movement-blank (12) and/or for holding the metal movement-blank (12) in a radial position.

10. The swaging tool according to claim 1, wherein the upper die (26) is configured so as to produce a relief pattern (38), in particular a logo, on a top front surface (15) of the movement-blank (12A), and be able to define the final shape of this top front surface (15) when A is the upper die (26) on this metal movement-blank (12).

11. Stamping process, implemented by a swaging tool (1) according to claim 1, the pliers (14) being initially in their opening position wherein the two arms (16A2, 16B2) of the pliers (14) are moved apart; wherein the process includes the following steps:

providing a metal movement-blank (12) equipped with an upper part (12A) and a lower part (12C);

placing the metal movement-blank (12) between the two arms (16A2, 16B2) of the pliers (14); then moving the two arms (16A2, 16B2) of the pliers (14) closer together up to the closing position of the pliers (14), so as to define the upper region (UR) and the lower region (LR) of said bed (10), for receiving the metal movement-blank (12), and said opening (18) between these upper and lower regions, an upper part (12A) and a lower part (12C) of the metal movement-blank (12) then being located respectively on both sides of the opening (18) along said movement axis (B-B') and thus respectively in the upper region (UR) and the lower region (LR);

moving the upper unit, along said movement axis (B-B'), towards the lower unit, and swaging the upper die (26) on the metal movement-blank (12); finally moving the two arms of the pliers apart to the opening position of the pliers (14); and ejecting, from the lower unit (2), the final part (11) obtained after swaging the metal movement-blank.

12. The stamping process according to claim 11, wherein the step of swaging the upper die (26) on the metal movement-blank (12) is synchronised with the closure of the two arms (16A2, 16B2) of the pliers (14), such that the two arms of the pliers reach the closing position, defining the upper and lower regions (UR and LR) of said bed (10), after the upper unit has started undergoing a movement along said movement axis (B-B') and before the swaging takes place.

13. A stamping process, implemented by a swaging tool (1) according to claim 10, the pliers (14) being initially in their opening position wherein the two arms (16A2, 16B2) of the pliers (14) are moved apart; wherein the process includes the following steps:

providing a metal movement-blank (12) equipped with an upper part (12A) and a lower part (12C);

placing the metal movement-blank (12) between the two arms (16A2, 16B2) of the pliers (14); then moving the two arms (16A2, 16B2) of the pliers (14) closer together up to the closing position of the pliers (14), so as to define the upper region (UR) and lower region (LR) of said bed (10), for receiving the metal movement-blank (12), and said opening (18) between these upper and lower regions, an upper part (12A) and a lower part (12C) of the metal movement-blank (12) then being located respectively on both sides of the opening (18) along said movement axis (B-B') and thus respectively in the upper region (UR) and the lower region (LR);

moving the upper unit, along said movement axis (B-B'), towards the lower unit, and swaging the upper die (26) on the metal movement-blank (12); finally moving the two arms of the pliers apart to the opening position of the pliers (14); and ejecting, from the lower unit (2), the final part (11) obtained after swaging the metal movement-blank.

14. The stamping process according to claim 13, wherein, during the step of swaging the upper die (26) on the metal movement-blank (12), the relief pattern (38), in particular a logo, is produced on the top front surface (15) of the movement-blank (12A), the final shape of the top front surface of the final part obtained with this stamping process being defined during this swaging.

15. The stamping process according to claim 13, wherein the metal movement-blank (12) is a horological crown movement-blank, said upper part (12A) of the metal movement-blank (12) being intended to form a crown head.

16. The stamping process according to claim 14, wherein the metal movement-blank (12) is a horological crown movement-blank, said upper part (12A) of the metal movement-blank (12) being intended to form a crown head.

17. The stamping process according to claim 11, wherein the metal movement-blank (12) includes a hollow intermediate portion (12B) separating the lower part (12C) and the upper part (12A) of the metal movement-blank (12), the lower part of the metal movement-blank forming a fluted part equipped with a plurality of longitudinal flutes (13) extending on the edge thereof and machined before swaging, the intermediate portion (12B) forming a groove on the edge of the metal movement-blank (12).

18. The stamping process according to claim 13, wherein the metal movement-blank (12) includes a hollow intermediate portion (12B) separating the lower part (12C) and the upper part (12A) of the metal movement-blank (12), the lower part of the metal movement-blank forming a fluted part equipped with a plurality of longitudinal flutes (13) extending on the edge thereof and machined before swaging, the intermediate portion (12B) forming a groove on the edge of the metal movement-blank (12).

* * * * *